(12) United States Patent
Lee et al.

(10) Patent No.: US 7,740,390 B2
(45) Date of Patent: Jun. 22, 2010

(54) SEGMENTED LIGHT GUIDE

(75) Inventors: Sian Tatt Lee, Penang (MY); Eit Thian Yap, Penang (MY); Choon Guan Ko, Penang (MY); Fook Chuin Ng, Butterworth (MY)

(73) Assignee: Avago Technologies ECBU IP (Singapore) Pte, Ltd., Singapore (SG)

( * ) Notice: Subject to any disclaimer, the term of this patent is extended or adjusted under 35 U.S.C. 154(b) by 220 days.

(21) Appl. No.: 11/941,678

(22) Filed: Nov. 16, 2007

(65) Prior Publication Data

US 2009/0129049 A1    May 21, 2009

(51) Int. Cl.
 *H04M 1/22* (2006.01)
(52) U.S. Cl. .................... 362/612; 362/24; 362/27; 362/88
(58) Field of Classification Search ............ 362/16, 362/24, 26, 27, 29, 85, 86, 88, 602, 612, 362/249.05, 249.12, 249.13
See application file for complete search history.

(56) References Cited

U.S. PATENT DOCUMENTS

| 3,216,394 | A | * | 11/1965 | Blackwell | 362/26 |
| 5,949,346 | A | | 9/1999 | Suzuki et al. | |
| 6,022,117 | A | * | 2/2000 | Tenmyo et al. | 362/16 |
| 7,357,523 | B2 | * | 4/2008 | Kao et al. | 362/24 |
| 7,543,971 | B2 | | 6/2009 | Lee et al. | |
| 2006/0193147 | A1 | * | 8/2006 | Inoue | 362/602 |
| 2007/0127227 | A1 | * | 6/2007 | Osawa | 362/29 |

* cited by examiner

*Primary Examiner*—Y My Quach Lee

(57) ABSTRACT

An exemplary embodiment of a segmented light guide includes a light channeling layer having at least one slit dividing the light channeling layer into a plurality of segments, and at least one LED associated with the light channeling layer. The slit substantially prevents light from migrating in the segmented light guide between adjacent segments that are divided by the slit.

12 Claims, 3 Drawing Sheets

SEGMENTED LIGHT GUIDE

BACKGROUND

Many electronic devices such as mobile phones have illuminated regions such as keypads. These regions are often illuminated by an electroluminescent (EL) panel that actively lights up across its surface when an electric current is passed through it. For example, a keypad having partially transparent graphics or icons may be placed above the EL panel so that the icons are illuminated by the EL panel underneath.

In devices having multiple regions to be independently illuminated, each region is typically illuminated by a separate EL panel. However, the EL panels have non-illuminating strips along the edges allowing for electrical connections. These non-illuminating strips prevent adjacent regions from being placed in close proximity. Furthermore, each EL panel is powered by a high voltage driver, so each independently illuminated region requires an additional high voltage driver, increasing the cost, complexity and size of an electronic device.

DESCRIPTION

The drawings and description, in general, disclose a segmented light guide, a method of making a segmented light guide and a portable electronic device using a segmented light guide. The exemplary segmented light guide comprises a sheet of a substantially transparent material, with one or more light sources illuminating the sheet. For example, light emitting diodes (LEDs) may be placed adjacent the sheet so that they direct light into an edge of the sheet. The light fills the light guide and illuminates the face of the light guide and any display elements adjacent the light guide. For example, a keypad having partially transparent graphics or icons may be placed above the light guide so that the icons are illuminated by the light guide. The segmented light guide may be divided into multiple regions by forming slits in the light guide between the regions. Light sources may be used to independently illuminate the regions. Light sources may also be placed to illuminate multiple segments that are partially separated by slits, by orienting the light source to shine into the multiple segments. The segmented light guide thus enables multiple closely spaced regions to be independently or simultaneously illuminated. The segmented light guide may be constructed simply and inexpensively using LED illumination or other such advantageous light sources.

Figure 1:
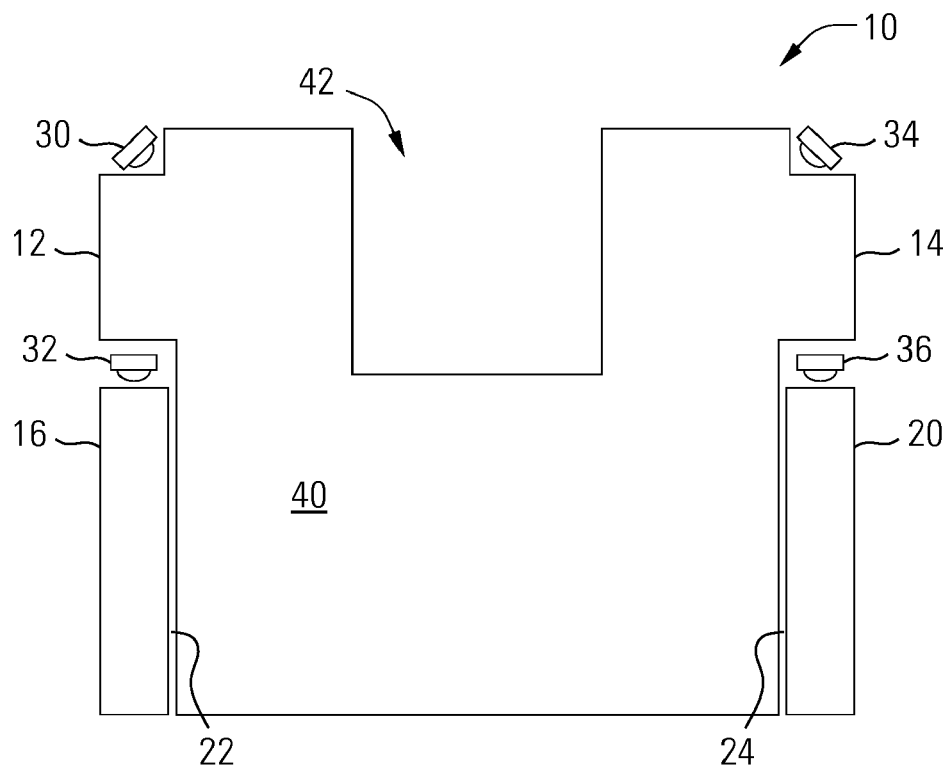
FIG. 1 is a top view of an exemplary segmented light guide having multiple completely separate segments.

Referring now to FIG. 1, an exemplary segmented light guide 10 includes a light channeling layer 12 divided into multiple segments 14, 16 and 20 by at least one slit 22 and 24.

The light channeling layer 12 may be made of any suitable material through which light propagates, such as a polyurethane sheet or other clear plastic material. The slits 22 and 24 in the exemplary embodiment are cuts all the way through the light channeling layer 12 from top to bottom, although the slits may alternatively comprise any partial cut, scrape, or groove, etc., that can be made in the light channeling layer 12 to impede light from propagating past the slit from one segment to the next.

Light may be introduced into the light channeling layer 12 in any suitable manner, such as by mounting LEDs 30, 32, 34 and 36 adjacent edges of the light channeling layer 12 to illuminate some or all of the segmented light guide 10. Microdots or any other techniques whether currently known or developed in the future may be used with the light channeling layer 12 to scatter light upward to illuminate the face 40 of the segmented light guide 10. For example, the polyurethane sheet forming the light channeling layer 12 may be embossed with microdots that scatter light upward.

The different segments 14, 16 and 20 can be independently illuminated. For example, to illuminate segment 14, one or both of LEDs 30 and 34 can be turned on. To illuminate segment 16, LED 32 can be turned on. To illuminate segment 20, LED 36 can be turned on. Non-illuminating regions 42 may also be formed by omitting regions in the light channeling layer 12 or by including slits that are oriented properly with respect to light sources so that light is substantially blocked from entering the non-illuminating region.

The slits (e.g., 22 and 24) may be formed by any suitable method, for example, using die cut tooling in a press to stamp the slits into the light channeling layer 12, or using a laser to make the cuts, etc. The slits (e.g., 22 and 24) may be made as simple narrow cuts, taking no care to widen the slit beyond the width of the cutting mechanism. Alternatively, the slits may be made wider than the cutting mechanism if desired to further separate adjacent segments (e.g., 16, 14 and 20). The slits 22 and 24 may be formed in straight lines, curves, or any desired geometry.

The use of a light guide that is segmented by slits and illuminated by a simple and inexpensive light source such as LEDs enables segments to be placed immediately adjacent one another. The permits the independent illumination of closely positioned regions of a device such as a keypad.

Figure 2:
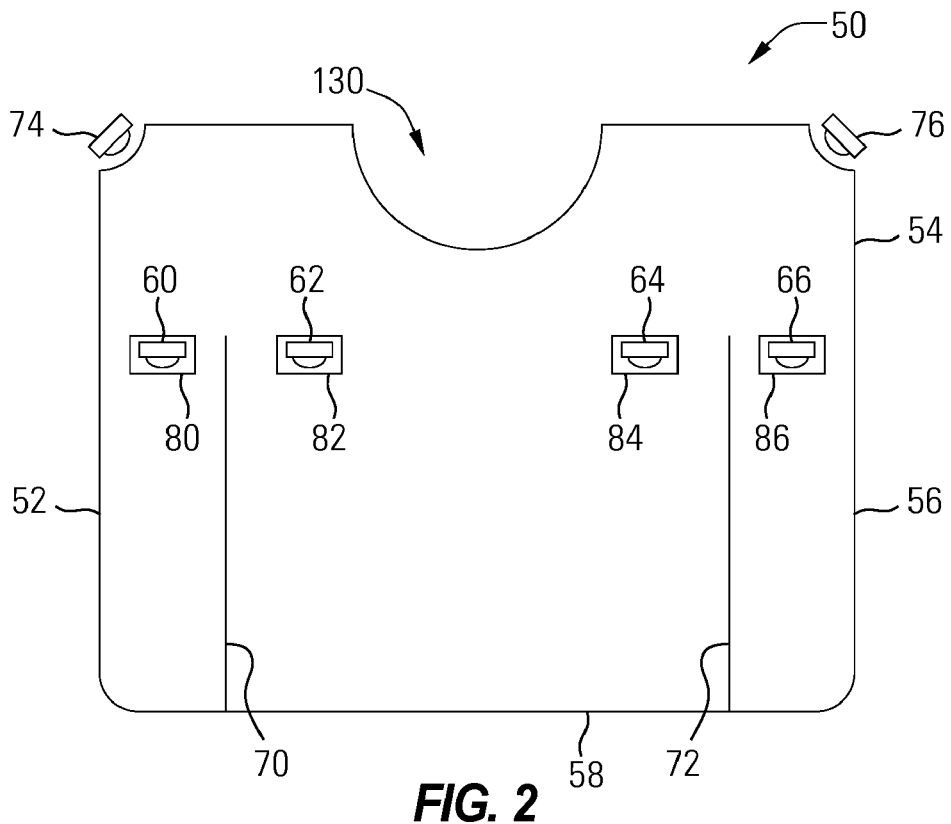
FIG. 2 is a top view of an exemplary segmented light guide having multiple partially connected segments.

Segments may be completely divided as described with respect to FIG. 1 or may be left partially connected to enable a single light source to illuminate multiple segments if desired. A segmented light guide 50 having multiple partially connected segments 52, 54, 56 and 58 is illustrated in FIG. 2. LED 60 may be used to independently illuminate segment 52, LEDS 62 and 64 may be used to independently illuminate segment 58, and LED 66 may be used to independently illuminate segment 56. Light is substantially blocked from propagating between segments 52, 58 and 56 by slits 70 and 72, and because of the position and orientation of LEDs 60-66, light does not appreciably propagate between their associated segments 52, 58 and 56. LEDs (e.g., 60-66) intended to illuminate only selected segments should be carefully placed to minimize leakage or propagation of light from one segment to another through connected areas.

Segments 52, 58 and 56 remain connected to the main portion or segment 54 of the segmented light guide 50. LEDs 74 and 76 may be used to illuminate the main segment 54 of the segmented light guide 50. Furthermore, because of the location and orientation of LEDs 74 and 76, they may also illuminate segments 52, 58 and 56. Their efficacy at illuminating these segments may depend upon factors such as the size of the segmented light guide 50, and the other LEDs 60-66 may also be used with LEDs 74 and 76 to fully simultaneously illuminate the entire segmented light guide 50. LEDs 60-66, 74 and 76 may be positioned as appropriate, such as at edges of the segmented light guide 50 or in cutouts 80, 82, 84 and 86 in the segmented light guide 50 that expose edges internally.

Propagation of light throughout segments and from one segment to the next may also be facilitated by the use of reflective surfaces or coatings on strategic edges of the light channeling sheet or by other methods of redirecting light within the light channeling sheet.

Figure 3A:
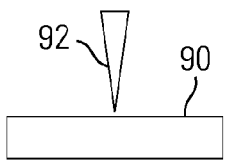
FIGS. 3A-3F are side views of exemplary slit profiles in a segmented light guide.
Figure 3B:
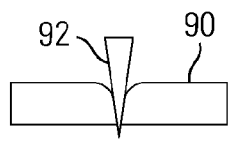
Figure 3C:
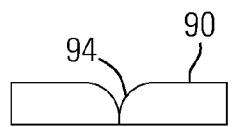
Figure 3D:
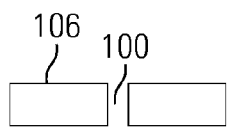
Figure 3E:
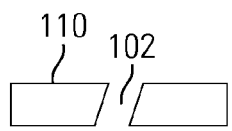
Figure 3F:
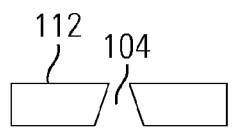

Referring now to FIGS. 3A-3F, slits (e.g., 94, 100, 102 and 104) may be cut or formed in a light channeling sheet (e.g., 106, 110 and 112) with any desired profile. For example, FIGS. 3A-3C illustrate the cutting of a slit 94 in a relatively elastic material such as a polyurethane sheet 90. This may be cut, for example, using die cut tooling 92. The elastic sheet 90 then relaxes, bringing the two adjacent segments substantially together to leave a very narrow slit 94 that divides the two segments without requiring wide separating strips. In alternative embodiments, for example those using more rigid light channeling sheet materials, a slit may be formed with a straight cut 100 in which the sides are perpendicular to the top surface of the sheet 106 as in FIG. 3D, or in other cuts as desired to minimize light propagation from one segment to another. For example, as illustrated in FIG. 3E, the cut 102 may be made at a non-perpendicular angle to the surface of the sheet 110, which may refract light at angles in the slit 102 that help prevent light from propagating across the slit 102 between neighboring segments of the sheet 110. Slits (e.g., 104) may also be made without parallel walls, as illustrated in FIG. 3F, or with any desired profile that best prevents light from propagating across the slit between neighboring segments according to physical constraints of the light guide, such as thickness of the light channeling sheet, width of the slit, etc.

Figure 4:
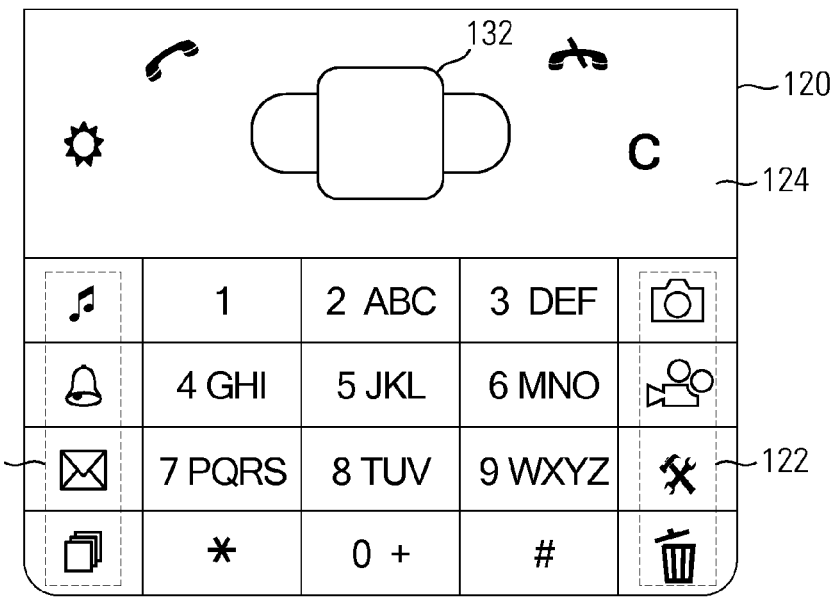
FIG. 4 is a top view of an exemplary keypad that may be illuminated by the segmented light guides of FIG. 1 or 2.

Referring now to FIG. 4, an exemplary keypad 120 will be described that may advantageously be illuminated by the segmented light guide described above. Note that the keypad and functions illustrated in FIG. 4 are merely examples and that the segmented light guide may be used to illuminate any device or object, and is not limited to use with a keypad or any particular device. The keypad 120 may have various functions that can be logically grouped and used independently, such as mobile phone functions, camera functions, or organizer functions. Segments of the keypad 120 containing these grouped functions may be independently illuminated by a segmented light guide. For example, a region 122 having camera buttons may be illuminated for use while leaving a region 124 containing mobile phone functions and a region 126 containing organizer functions dark. This saves power and may simplify use of the keypad 120 by reducing the number of illuminated buttons to be considered while performing a specific task, such as capturing an image using buttons in the camera segment 122.

The keypad 120 of FIG. 4 may be placed over the segmented light guides 10 or 50 of FIGS. 1 and 2 to independently illuminate regions of the keypad 120. For example, using the segmented light guide 50 of FIG. 2 with the keypad 120, LED 60 can illuminate region 126 of the keypad 120 via segment 52 of the light channeling sheet. LED 66 can illuminate region 122 of the keypad 120 via segment 56 of the light channeling sheet. Mobile phone functions of the keypad 120 can either be illuminated all together using LEDS 62, 64, 74 and 76 to illuminate segments 54 and 58, or the mobile phone dialing buttons can be illuminated along by LEDS 62 and 64 via segment 58. The entire keypad 120 may also be simultaneously illuminated using LEDs 60-66, 74 and 76. Portions (e.g., 130) of the segmented light guide 50 may be omitted to fit over non-illuminated regions of the keypad 120, for example to allow room for large buttons 132 on the keypad 120 as needed.

Figure 5:
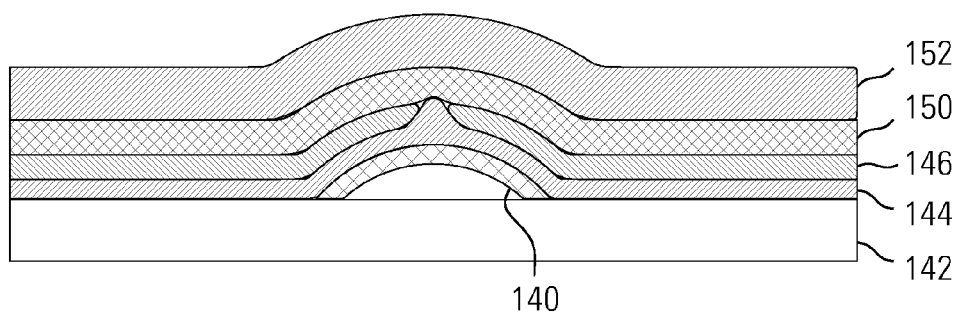
FIG. 5 is a cross-sectional view of an exemplary keypad and segmented light guide.

A keypad (e.g., 120) may be placed over or adjacent a segmented light guide, or the keypad 138 can be manufactured with an integral segmented light guide as illustrated in the cross-sectional view of FIG. 5. The keypad layers of the device may comprise any suitable means now known or that may be developed in the future, and the integral segmented light guide in a keypad is not limited to the particular exemplary layers and architecture illustrated in FIG. 5. For example, buttons (e.g., 140) may be formed on a substrate 142 in any manner desired, such as a blister type button 140 or using hinged plastic buttons (not shown). A plunger layer 144 and mylar sheet 146 or other structures may be used as desired to enable the functionality of the keypad. A light channeling layer 150 of a segmented light guide may be formed over the functional keypad layers 140, 144 and 146, followed by a keypad membrane 152 having printed graphics to be illuminated.

Figure 6:
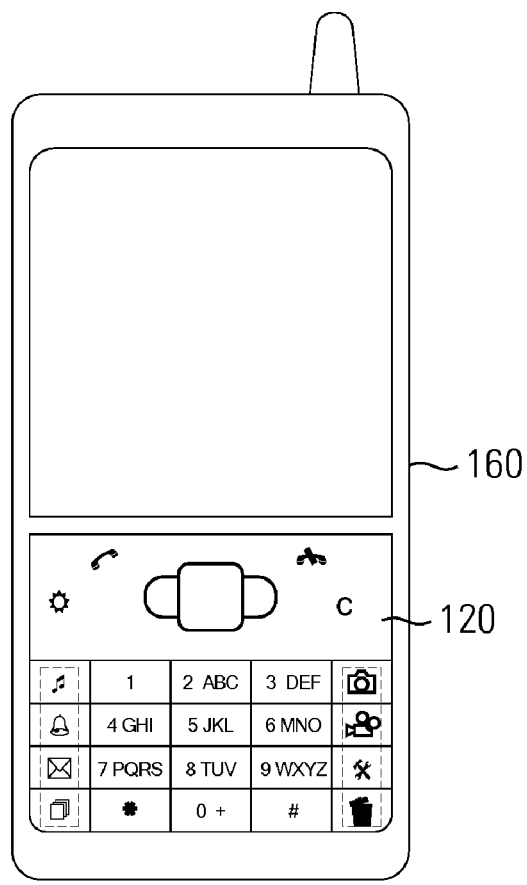
FIG. 6 is an exemplary portable electronic device having a segmented light guide.

A portable electronic device 160 that may employ a segmented light guide to illuminate a keypad 120 is illustrated in FIG. 6. The portable electronic device 160 may comprise a mobile phone or any other device, such as a personal digital assistant (PDA), global positioning system (GPS) device, portable computer, a camera, etc. As described above, the segmented light guide used to illuminate the keypad 120 in the portable electronic device 160 may have multiple fully separated segments as described with respect to FIG. 1 or may comprise a single sheet of at least partially connected segments as described with respect to FIG. 2.

Figure 7:
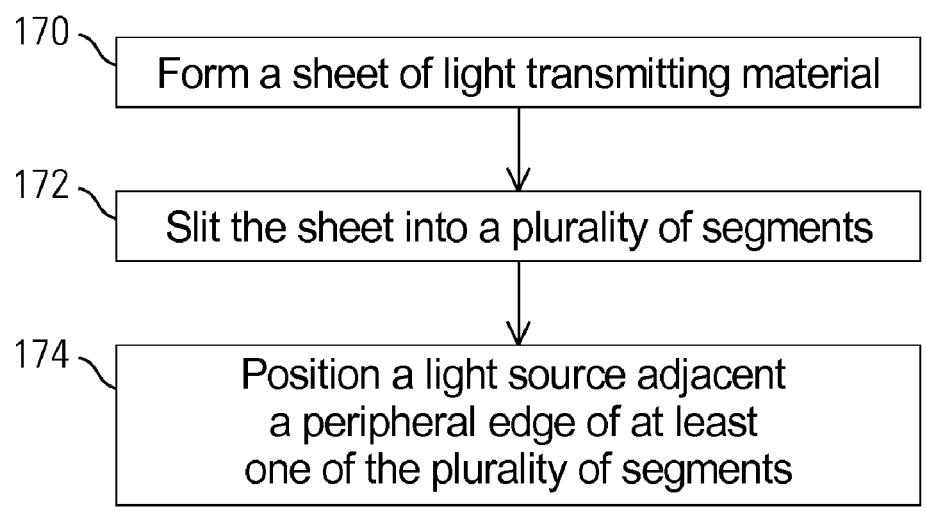
FIG. 7 is a flowchart of an exemplary operation for making a segmented light guide.

An exemplary operation for forming a sheet of light transmitting material is illustrated in the flowchart of FIG. 7. A sheet of light transmitting material is formed 170, such as a sheet of polyurethane. Any other suitable light transmitting material may be used to meet the requirements of the system to be illuminated. For example, a polyurethane sheet has the advantage of being soft, easily cut and elastic to withstand the rigors of the cutting operation and being formed to flexible parts such as a keypad 138 described above with respect to FIG. 5. The light transmitting material may be slit 172 into a plurality of segments as described above, for example using die cut tooling, a laser cutter, or any other suitable cutting method. Light sources are positioned 174 adjacent edges of the sheet to illuminate the segments, or are alternatively associated with the sheet in any suitable manner. Microdots or other light scattering mechanisms and reflective surfaces, etc. may also be formed on the sheet as desired.

The segmented light guide disclosed herein provides a simple, inexpensive and effective way to independently illuminate closely neighboring regions of a keypad or other device, without requiring multiple complex power sources.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A segmented light guide comprising:
    a light channeling layer having at least one slit dividing said light channeling layer into a plurality of segments; and
    light sources optically coupled with said plurality of segments operable to independently illuminate different ones of said plurality of segments at different times; and at least another one light source optically coupled with said plurality of segments operable to illuminate multiple ones of said plurality of segments simultaneously.

2. The segmented light guide of claim 1, said light channeling layer comprising a resilient sheet.

3. The segmented light guide of claim 1, said light sources optically coupled with said plurality of segments operable to independently illuminate different ones of said plurality of segments at different times and said at least another one light source optically coupled with said plurality of segments operable to illuminate multiple ones of said plurality of segments simultaneously comprising at least one LED.

4. The segmented light guide of claim 1, said light sources optically coupled with said plurality of segments operable to independently illuminate different ones of said plurality of segments at different times and at least another one light source optically coupled with said plurality of segments operable to illuminate multiple ones of said plurality of segments simultaneously being located adjacent edges of said light channeling layer.

5. The segmented light guide of claim 1, said slit having walls perpendicular to a surface of said light channeling layer.

6. The segmented light guide of claim 1, said slit having angled walls that are not perpendicular to a surface of said light channeling layer.

7. A portable electronic device, comprising:
a first region to be illuminated;
a second region to be illuminated; and
a segmented light guide having a first segment adjacent said first region and a second segment adjacent said second region, said segmented light guide comprising a substantially transparent sheet having a slit between said first segment and said second segment; said segmented light guide further comprising
a first light source optically coupled with said first segment and a second light source optically coupled with said second segment, said first and second light source being independently operable, whereby said first region and said second region may be illuminated by said first light source and said second light source at different times; and
a third light source optically coupled with both said first segment and said second segment whereby said first region and said second region may be simultaneously illuminated by said third light source.

8. The portable electronic device of claim 7, said substantially light transparent sheet comprising a resilient sheet.

9. The portable electronic device of claim 7, comprising a device selected from the group consisting of a mobile phone, personal digital assistant, camera, global positioning system (GPS) device, and a portable computer.

10. The portable electronic device of claim 7, said first region and said second region comprising portions of a keypad.

11. The portable electronic device of claim 7, wherein said first segment and said second segment remain connected although partially divided by said slit.

12. The portable electronic device of claim 7, wherein said first segment and said second segment are fully separate and said slit comprises a gap remaining when said first and second segments have been placed adjacent one another.

* * * * *